United States Patent [19]
Daido et al.

[11] Patent Number: 5,480,000
[45] Date of Patent: Jan. 2, 1996

[54] ELECTRIC POWER STEERING APPARATUS

[75] Inventors: Toshihiko Daido, Nara; Mitsuhiko Nishimoto, Kashihara; Hirofumi Matsuoka, Kyoto, all of Japan

[73] Assignee: Koyo Seiko Co., Ltd., Osaka, Japan

[21] Appl. No.: 280,015

[22] Filed: Jul. 25, 1994

[30] Foreign Application Priority Data

Jul. 30, 1993 [JP] Japan ............... 5-190496

[51] Int. Cl.$^6$ ............... B62D 5/04
[52] U.S. Cl. ............... 180/79.1; 364/424.05
[58] Field of Search ............... 180/79.1; 364/424.05

[56] References Cited

U.S. PATENT DOCUMENTS

| | | | |
|---|---|---|---|
| 4,657,103 | 4/1987 | Shimizu | 180/79.1 X |
| 4,681,181 | 7/1987 | Shimizu | 180/79.1 |
| 4,688,655 | 8/1987 | Shimizu | 180/79.1 |
| 4,875,539 | 10/1989 | Abukawa et al. | 180/79.1 |
| 5,150,021 | 9/1992 | Kamono et al. | 180/79.1 X |
| 5,202,830 | 4/1993 | Tsurumiya et al. | 180/79.1 X |
| 5,299,648 | 4/1994 | Watanabe et al. | 180/79.1 |
| 5,303,156 | 4/1994 | Matsuoka et al. | 180/79.1 X |

FOREIGN PATENT DOCUMENTS

522466A1  1/1993  European Pat. Off.

*Primary Examiner*—Kevin T. Hurley
*Attorney, Agent, or Firm*—Darby & Darby

[57] ABSTRACT

In an electric power steering apparatus, in which an electric motor for assisting the steering torque is adapted to be driven by PWM wave, and the duty of the PWM wave is adapted to be under the feedback control in time series by detecting the driving current of the motor, when the direction of the target current in this time for the feedback control is different from that of the former time, or when the detected driving current in the motor is zero, the former target voltage of the motor for the feedback control is forcibly set to the voltage value decided in reference to the minimum duty of the PWM wave for driving the motor.

7 Claims, 4 Drawing Sheets

ELECTRIC POWER STEERING APPARATUS

BACKGROUND OF THE INVENTION

1. Field of the Invention

The present invention relates to an electric power steering apparatus which employs an electric motor to provide power to assist the steering force for a vehicle.

2. Description of Related Art

The electric power steering apparatus serves to detect the steering torque and to assist the steering force by the rotation of an electric motor to be driven according to the detected torque.

FIG. 1 is a block diagram showing an outline construction of the electric power steering apparatus. The output, of a torque sensor 2 provided on a steering shaft (not shown) is inputted through an interface 3 into a CPU 1. In CPU 1 first an A/D conversion 11 is carried out and then a phase compensation 12 performed. The output of a vehicle speed sensor 7 is also inputted into CPU 1. In a memory of the CPU 1, there is stored a table 13 of the relations between the detected torques and vehicle speeds and the target current values of the drive current for an electric motor 5, and the target current corresponding to the inputted torque and vehicle speed is read out. Also, in CPU 1 the output of A/D conversion is differentiated 18, and this result is added to the read-out target current 14. The addition of the differentiated value is for the purpose of the inertial compensation of the motor 5.

In the CPU 1, the deviation is calculated 15 between the added result and the feedback drive current of the motor 5 which is detected by a drive current detector 6 and the A/D conversion 19 is carried out. The deviation is subjected to a PI calculation 16 and a control variable is calculated, and a PWM wave signal 17 corresponding to the variable and the signal indicating the rotation direction of the motor 5 is produced. The PWM signals are applied to a driving circuit 4 which is constructed as an H-type bridge of four switch transistors for a motor 5.

FIG. 2 is a flow chart showing the operating steps of the conventional PI calculation 16 in the CPU 1. The difference $\Delta I_n$ is obtained between the target current $I_M$ as the added result 14 and the detected driving current $I_s$ of the motor 5 (S1). Next, the integral element $I_n$ (expressed as a voltage) is calculated (S2) as follows;

$$I_n = \Delta I_n \times K_I \quad (K_I\text{:constant})$$

Next, the difference $\Delta P_n$ is calculated between $\Delta I_n$ and the former difference $\Delta I_{n-1}$ (S3) as follows;

$$\Delta P_n = \Delta I_n - \Delta I_{n-1}$$

then, the proportional element $P_n$ (expressed as a voltage) is calculated as follows (S4);

$$P_n = \Delta P_n \times K_p \quad (K_p\text{:constant})$$

And, the target voltage value $V_M$ to be given to the motor 5 is calculated (S5) as follows;

$$V_M = \{(V_O + I_n + P_n) + V_O\}/2$$

then, the data are renewed (S6). After this, the duty cycle of the PWM wave required to realize the target voltage is calculated.

The motor 5 is an inductive load type, so that the current does not need to flow when the PWM wave duty cycle is small. For reasons such as the capacity of the CPU 1, the PWM wave has a frequency of about 20 kHz. It this frequency, the current can flow in the motor more than 50% of the PWM duty cycle. Then, the constants $K_I$, $K_P$ are set up so that the stable control may be performed at more than 50% of the PWM duty cycle. As a result, there was a problem that the response was too late until the duty cycle reached over 50% at the rise of the motor current.

This is because $I_M$ and $I_S$ are all small, $\Delta I_n$ is small, and it is required that the operating steps of S1 to S6 are repeatedly carried out over a considerable number of times until $V_M$ or the duty cycle becomes a certain large value. Owing to this poor response, there was a problem that when the steering was repeated right and left, the assistance force was behind the steering force, and the operator felt vibration.

SUMMARY OF THE INVENTION

An object of the present invention is to provide an electric power steering apparatus wherein the response is improved by forcibly increasing the former target voltage, for example, to the value equivalent to 50% of the duty under the predetermined conditions, and vibration of the steering wheel is prevented.

In the electric power steering apparatus of the invention, an electric motor for assisting the steering torque is adapted to be driven by a PWM wave, and the duty cycle of the PWM wave is adapted to be under feedback control in time series by detecting the driving current of the motor. The apparatus is provided with a first means for judging whether predetermined conditions are fulfilled or not, and a second means for setting the former target voltage of the motor for the feedback control to the voltage value decided in reference to the minimum duty cycle of the PWM wave for driving the motor when the above-described conditions are fulfilled by the first means. The conditions are defined that the direction of the target current in this time is switched from that in the former time or that the detected value of the driving current of the motor is zero.

Even when the current is rising, the former target voltage, and therefore this time target voltage is immediately set to the value equivalent to a high value duty cycle, so that the motor can be driven in short order, the response is improved, and accordingly the vibration does not occur even when the steering is repeated right and left.

The above and further objects and features of the invention will more fully be apparent from the following detailed description with accompanying drawings.

DESCRIPTION OF THE PREFERRED EMBODIMENTS

Hereinafter, the present invention will be described according to the drawings showing its embodiments.

Figure 1:
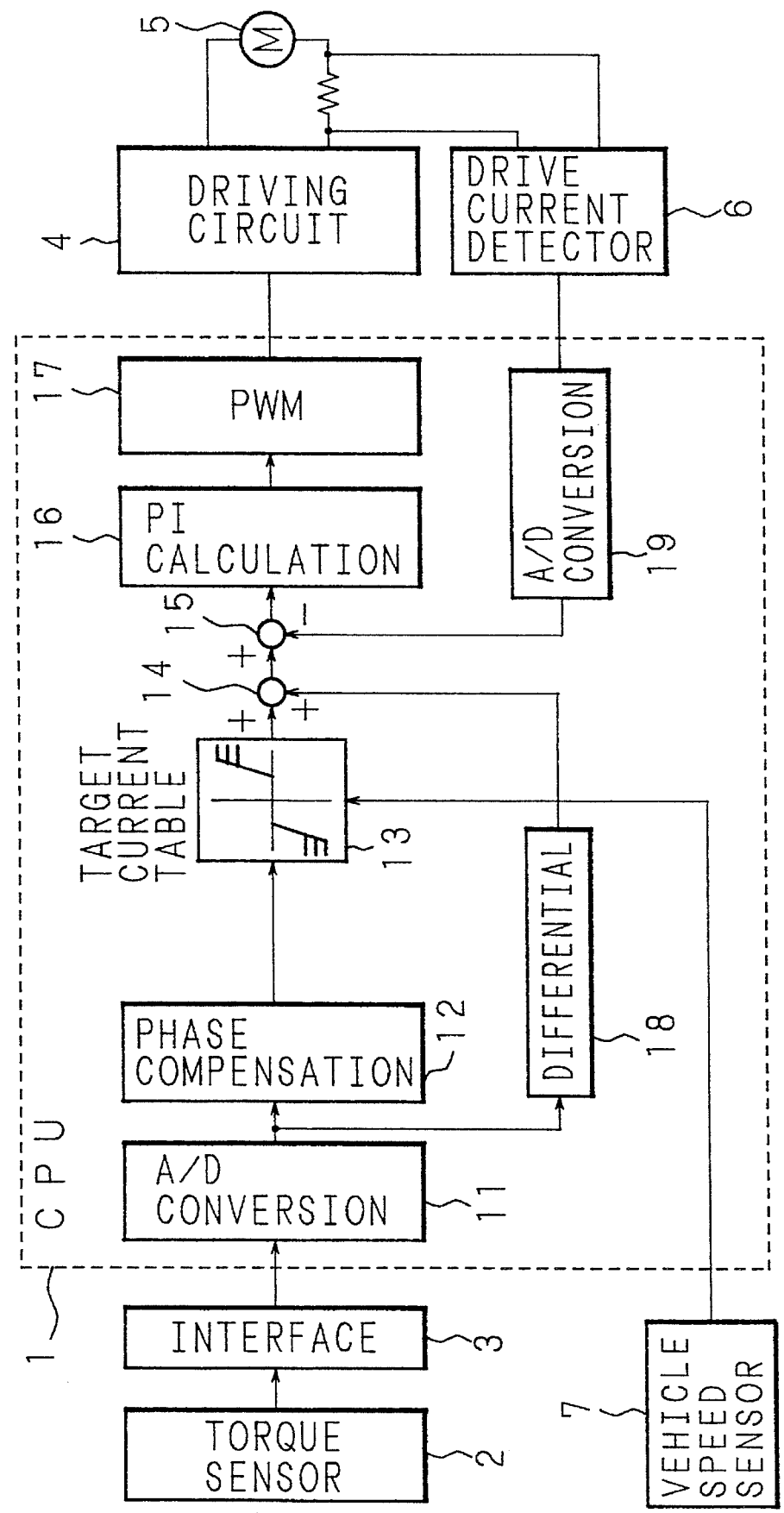
FIG. 1 is a block diagram of an electric power steering apparatus.
Figure 2:
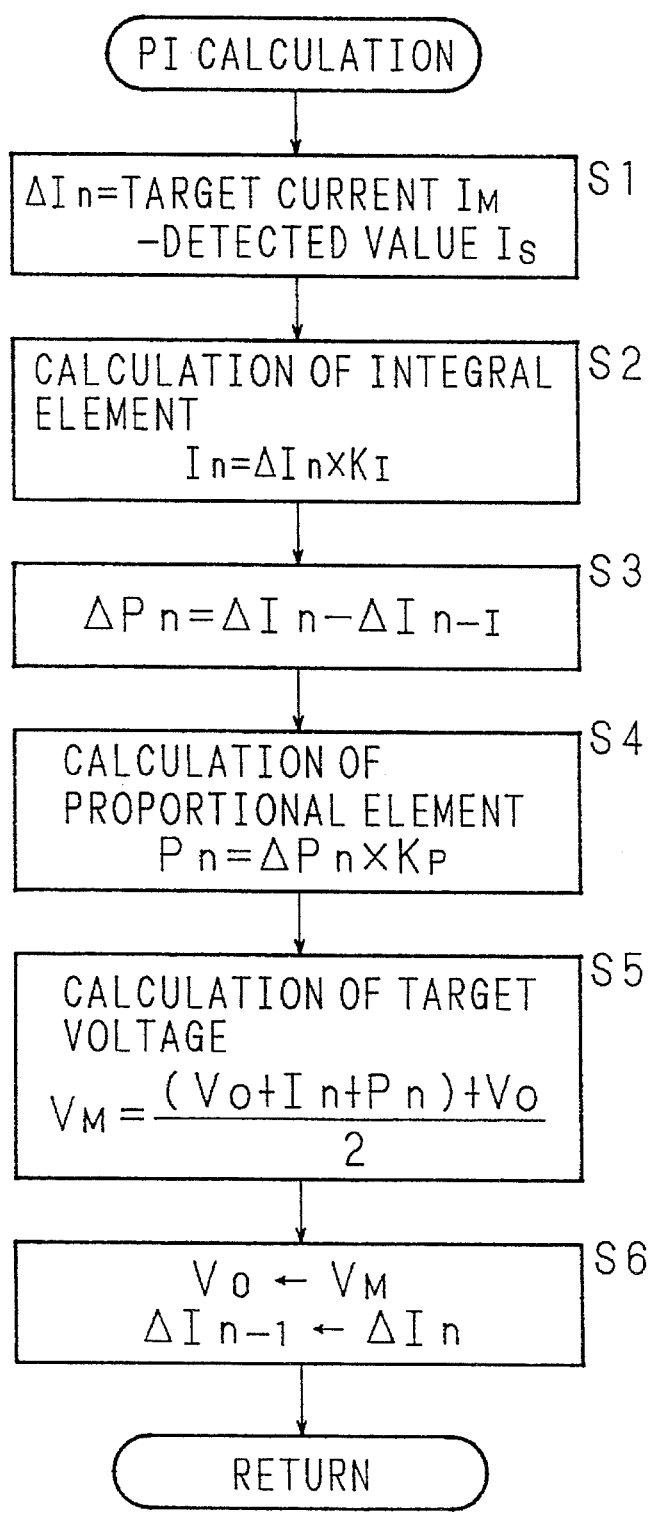
FIG. 2 is a flow chart of the conventional PI (proportional integral) calculation.
Figure 3:
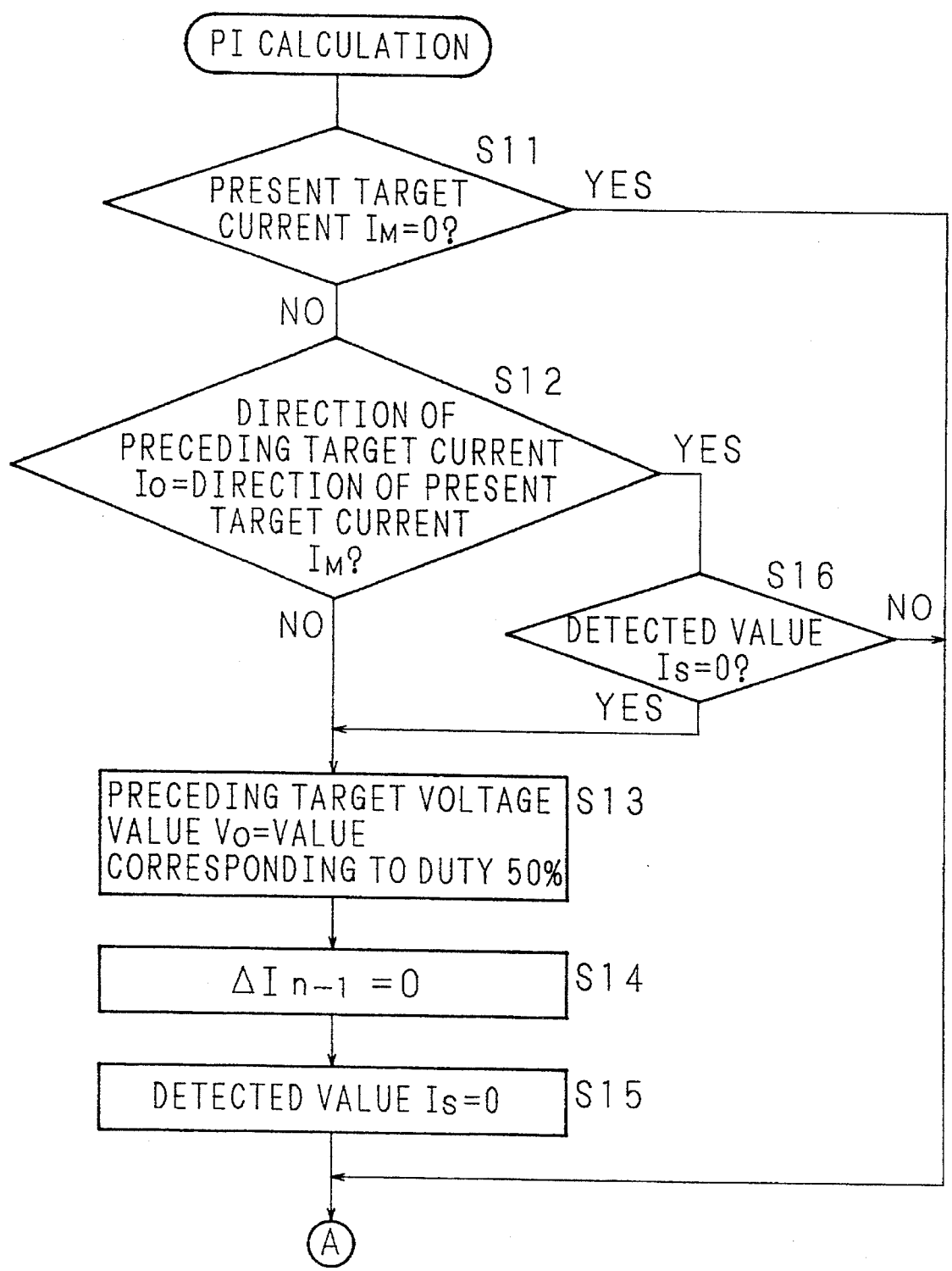
FIG. 3 is a flow chart of the PI calculation of the invention.
Figure 4:
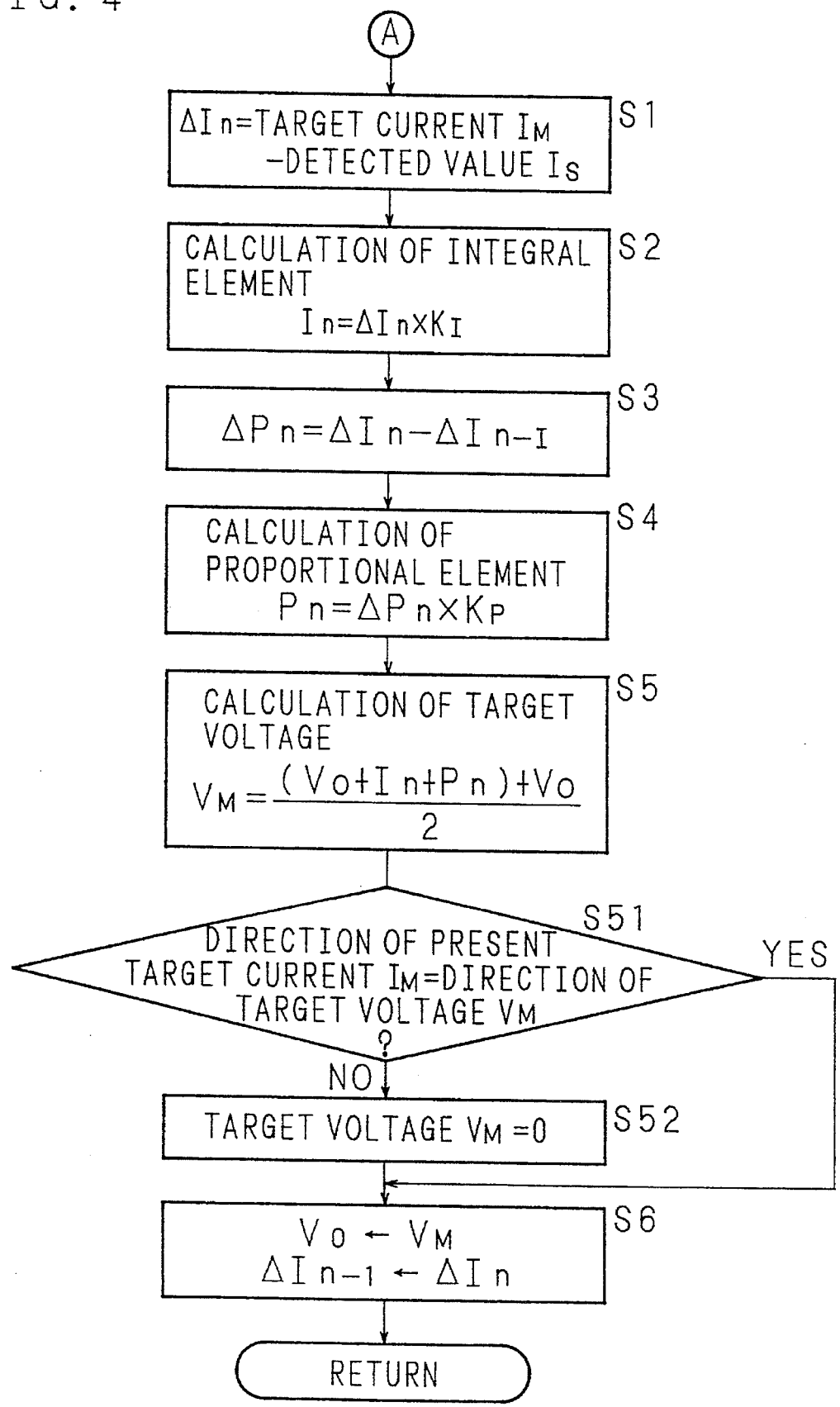
FIG. 4 is a flow chart of the PI calculation of the invention.

The hardware construction of the electric power steering apparatus according to the present invention is as shown in FIG. 1. And, the difference from the prior art is in the operating steps relating to the PI calculation 16 performed in the CPU 1. FIG. 3 and 4 are flow charts showing those operating steps.

It is judged whether the target value in this time $I_M = 0$ or not (S11) with regard to the driving current of the electric motor to be obtained according to the added result 14. In the case of $I_M = 0$, the operation is transferred to the step S1 for seeking the conventional control target current $\Delta I_n$.

In the case of $I_M \neq 0$, it is judged whether the direction of the former target current $I_O$ and that of this time target current $I_M$ are same or not (S12). When the directions are same, it is judged whether the detected value $I_S = 0$ or not (S16) with regard to the driving current of the electric motor 6. When $I_S \neq 0$, the operation is transferred to the step S16. That is, when this time target current $I_M = 0$, or when the directions of the steering are the same (the direction of the target current is not changed) and moreover if $I_S$ is not 0 (already the current has flowed), the decision of the target current $V_M$ may be performed in the conventional manner (S1 to S5).

On the contrary, when the direction of $I_O$ and that of $I_M$ are different (when the direction of the detected torque is changed), or when $I_S = 0$ (when the current is about to flow), the operation is transferred to the next step S13, where the former target voltage $V_O$ is set in a value equivalent to a 50% duty cycle of the PWM wave (S13). This value may be properly determined according to the requirement for the level of the response. Accordingly, it is set that $\Delta I_{n-1} = 0$ (S14) and $I_S = 0$ (S15). After that, the operation is transferred to the step S1. That is, in such a case, there becomes the state of the minimum duty cycle of the PWM wave where the motor 5 may substantially be driven. And moreover, such a situation is forcibly made that the motor 5 would not be driven in the former state.

The target voltage obtained $V_M$ in the step S5 is employed in the PWM wave calculation 17. After this step S5, it is judged whether the direction of $V_M$ and that of $I_M$ are same or not (S51). In the case of the same direction, the operation is transferred to the step S6. In the case of the different directions, $V_M = 0$ is set (S52). This serves to drive the motor 5 only in the direction of the target current $I_M$, and not to drive the motor 5 when $I_M$ and $V_M$ are different in directions. Then, for the next calculation, the data are renewed such that $V_M$ is set to $V_o$ and $\Delta I_n$ to $\Delta I_{n-1}$ (S6).

In the present invention as described above, since the duty cycle of the PWM wave is forcibly increased to the value relating to the minimum value for driving the motor when the direction of the steering is switched, or when the motor is about to be driven, the motor can be rapidly driven in the direction required for the assistance, and accordingly the generation of any vibration may be prevented even when the steering to right and left is repeated.

As this invention may be embodied in several forms without departing from the spirit of essential characteristics thereof, the present embodiment is therefore defined by the appended claims rather than by the description preceding them, and all changes that fall within metes and bounds of the claims, or equivalence of such metes and bounds thereof are therefore intended to be embraced by the claims.

What is claimed is:

1. An electric power steering apparatus, in which an electric motor for assisting steering torque of the apparatus is adapted to be driven by a PWM wave, and the duty cycle of the PWM wave is adapted to be under feedback control in time series by detecting the driving current of the electric motor, comprising:

first means for judging whether predetermined conditions are fulfilled or not, and second means for setting a target voltage of the electric motor for the feedback control to a voltage value decided in reference to the minimum duty cycle of the PWM wave for driving the electric motor when the predetermined conditions are fulfilled by said first means.

2. An electric power steering apparatus as set forth in claim 1, wherein said first means judges whether the direction of the target current for the feedback control is different from that at a prior time.

3. An electric power steering apparatus as set forth in claim 1, wherein said first means judges whether the detected value of the driving current in the electric motor is zero or not.

4. An electric power steering apparatus as set forth in claim 1, wherein the minimum duty cycle of the PWM wave for driving the electric motor is about 50%.

5. An electric power steering apparatus, comprising:

an electric motor for assisting the steering torque of the apparatus;

driving means for driving said electric motor with a PWM wave;

detecting means for detecting the driving current in said electric motor;

control means for performing feedback control for the duty cycle of the PWM wave in time series;

judging means for judging whether predetermined conditions are fulfilled or not; and setting means for setting a target voltage of said electric motor for the feedback control to a voltage value decided in reference to the minimum duty cycle of the PWM wave for driving said electric motor when it is judged by said judging means that the predetermined conditions are fulfilled.

6. An electric power steering apparatus, comprising:

an electric motor for assisting the steering torque of the apparatus;

driving means for driving said electric motor with a PWM wave;

detecting means for detecting the driving current in said electric motor;

control means for performing feedback control for the duty cycle of the PWM wave in time series;

judging means for judging whether the direction of the target current for the feedback control is different from that at a prior time; and setting means for setting the target voltage of said electric motor for the feedback control during said prior time to a voltage value decided in reference to the minimum duty cycle of the PWM wave for driving said electric motor when it is judged by said judging means that the direction of the target current in the present time is switched.

7. An electric power steering apparatus, comprising:

an electric motor for assisting the steering torque of said apparatus;

driving means for driving said electric motor with a PWM wave;

detecting means for detecting the driving current in said electric motor;

control means for performing feedback control for the duty cycle of the PWM wave in time series; and setting means for setting a target voltage of said electric motor for the feedback control of a prior time to the voltage value decided in reference to the minimum duty cycle of the PWM wave for driving said electric motor when it is detected by said detecting means that the driving current in said electric motor is zero.

\* \* \* \* \*